US 8,493,880 B2

(12) United States Patent
Shinomiya

(10) Patent No.: US 8,493,880 B2
(45) Date of Patent: Jul. 23, 2013

(54) NETWORK SYSTEM

(75) Inventor: Hirotatsu Shinomiya, Sakai (JP)

(73) Assignee: Panasonic Corporation, Osaka (JP)

( * ) Notice: Subject to any disclaimer, the term of this patent is extended or adjusted under 35 U.S.C. 154(b) by 118 days.

(21) Appl. No.: 13/147,298

(22) PCT Filed: Feb. 2, 2010

(86) PCT No.: PCT/JP2010/051432
§ 371 (c)(1),
(2), (4) Date: Nov. 4, 2011

(87) PCT Pub. No.: WO2010/087498
PCT Pub. Date: Aug. 5, 2010

(65) Prior Publication Data
US 2012/0047226 A1    Feb. 23, 2012

(30) Foreign Application Priority Data
Feb. 2, 2009   (JP) ................................. 2009-021989

(51) Int. Cl.
*H04L 12/28*    (2006.01)
*H04W 4/00*    (2009.01)
*G06F 15/16*    (2006.01)

(52) U.S. Cl.
USPC ............ 370/252; 370/338; 709/217; 709/219

(58) Field of Classification Search
USPC ........................... 370/252, 338; 709/217–219
See application file for complete search history.

(56) References Cited

U.S. PATENT DOCUMENTS

| 7,444,421 | B2 * | 10/2008 | Katayama ...................... 709/232 |
| 2006/0252439 | A1 * | 11/2006 | Cai .................................. 455/515 |
| 2008/0002591 | A1 * | 1/2008 | Ueno ............................. 370/244 |
| 2008/0240215 | A1 * | 10/2008 | Nobukiyo et al. ............. 375/225 |
| 2011/0010592 | A1 * | 1/2011 | Takayanagi et al. .......... 714/704 |

FOREIGN PATENT DOCUMENTS

| JP | 2005-217743 A | 8/2005 |
| JP | 2008-011229 A | 1/2008 |
| JP | 2008-244911 A | 10/2008 |

OTHER PUBLICATIONS

International Search Report for International Patent Application No. PCT/JP2010/051432 issued Mar. 2, 2010.

* cited by examiner

*Primary Examiner* — Joseph Avellino
*Assistant Examiner* — Aftab Nasir Khan
(74) *Attorney, Agent, or Firm* — Renner, Otto, Boisselle & Sklar, LLP

(57) ABSTRACT

The network system includes a controller and a plurality of terminals. The controller repeats transmitting a request signal indicative of a predetermined probability. Upon receiving the request signal, the terminal sends, at the probability indicated by the request signal, a response signal including the identification information uniquely allocated to the terminal. Upon receiving the response signal, the controller sends a notification signal with reference to the identification information included in the response signal. The terminal judges whether or not a response has been completed, on the basis of the received notification signal. The terminal sends no response signal in response to receiving the request signal once after judging that the response has been completed. The controller prepares the next request signal indicative of the probability not less than that indicated by the previous request signal.

5 Claims, 8 Drawing Sheets

NETWORK SYSTEM

TECHNICAL FIELD

The present invention is directed to network systems, and particularly to a network system comprising a controller and a plurality of terminals, each terminal sending a response signal to the controller in response to receiving a request signal from the controller.

BACKGROUND ART

Document 1 (JP 2008-11229 A) discloses a multicast network system which includes a monitoring server and a plurality of response agents (terminals). The monitoring server creates a response request message including a response probability, and therefore sends the response request message to the plurality of the response agents. The response agent judges, on the basis of the response probability, whether or not it responds to the response request message. The response agent sends a response message (response signal) upon determining that it responds to the response request message.

In the network system disclosed in Document 1, some response agents receiving the response request message sends the response message to the monitoring server. Consequently, the number of response messages sent to the monitoring server can be less than the maximum number of the response messages which the monitoring server receives simultaneously.

However, the network system disclosed in Document 1 cannot receive the response messages respectively from all of the response agents.

DISCLOSURE OF INVENTION

In view of the above insufficiency, the present invention has been aimed to propose a network system capable of successfully receiving response signals respectively from all of terminals.

The network system in accordance with the present invention comprises a controller, and a plurality of terminals connected to the controller via a network. The controller comprises a first communication unit configured to communicate with the terminals via the network, a request unit, and a response storage unit. Each of the terminals comprises a second communication unit configured to communicate with the controller via the network, a identification storage unit configured to store identification information assigned to the terminal, a response unit, and a response confirmation unit. The request unit is configured to repeat sending a request signal to the plurality of the terminals via the first communication unit, the request signal including probability information indicative of a predetermined probability. The response unit is configured to, upon receiving the request signal via the second communication unit, send a response signal via the second communication unit at the probability indicated by the probability information included in the request signal. The response signal includes terminal identification information indicative of the identification information stored in the identification storage unit. The response storage unit is configured to, upon receiving the response signal via the first communication unit, store the identification information indicated by the terminal identification information included in the response signal. The request unit is configured to refer to the identification information stored in the response storage unit, and send via the first communication unit, a notification signal announcing completion of a response to the terminal which has been sent the response signal. The response confirmation unit is configured to, upon receiving the notification signal via the second communication unit, judges whether or not the response has been completed on the basis of the notification signal. The response unit is configured not to send the response signal via the second communication unit in response to receiving the request signal via the second communication unit once after the response confirmation unit judges that the response has been completed. The request unit is configured to prepare the next request signal including the probability information indicative of the probability not less than that indicated by the probability information included in the previous request signal.

In a preferred aspect, the controller further comprises a counting unit, a terminal number determination unit, and a probability determination unit. The counting unit is configured to count the response signal received by the first communication unit after the first communication unit sends the request signal. The terminal number determination unit is configured to determine a total number of the terminals responding to the controller on the basis of the probability indicated by the probability information included in the request signal sent by the first communication unit and the number of the response signals obtained from the counting unit. The probability determination unit is configured to determine the probability on the basis of the total number of the terminals determined by the terminal number determination unit. The request unit is configured to create the request signal including the probability information indicative of the probability determined by the probability determination unit.

In a preferred aspect, the controller further comprises a counting unit, a terminal number determination unit, and a termination judgment unit. The counting unit is configured to count the response signal received by the first communication unit after the first communication unit sends the request signal. The terminal number determination unit is configured to determine a total number of the terminals responding to the controller on the basis of the probability indicated by the probability information included in the request signal sent by the first communication unit and the number of the response signals obtained from the counting unit. The termination judgment unit is configured to judge whether or not the controller has received the response signals respectively from all of the terminals responding to the request signal on the basis of the total number of the terminals determined by the terminal number determination unit and the number of the response signals obtained from the counting unit. The request unit is configured to terminate repeating sending the request signal via the first communication unit upon acknowledging that the termination judgment unit determines that the controller has received the response signals respectively from all of the terminals responding to the request signal.

In a preferred aspect, the request unit is configured to terminate repeating sending the request signal via the first communication unit upon sending the request signal including the probability information indicative of the probability of 100% via the first communication unit.

In a preferred aspect, the request unit is configured to terminate repeating sending the request signal via the first communication unit unless the request unit receives the response signal via the first communication unit within a predetermined time period starting from the time of sending the request signal including the probability information indicating the probability of 100% via the first communication unit.

BEST MODE FOR CARRYING OUT THE INVENTION

First Embodiment

Figure 1:
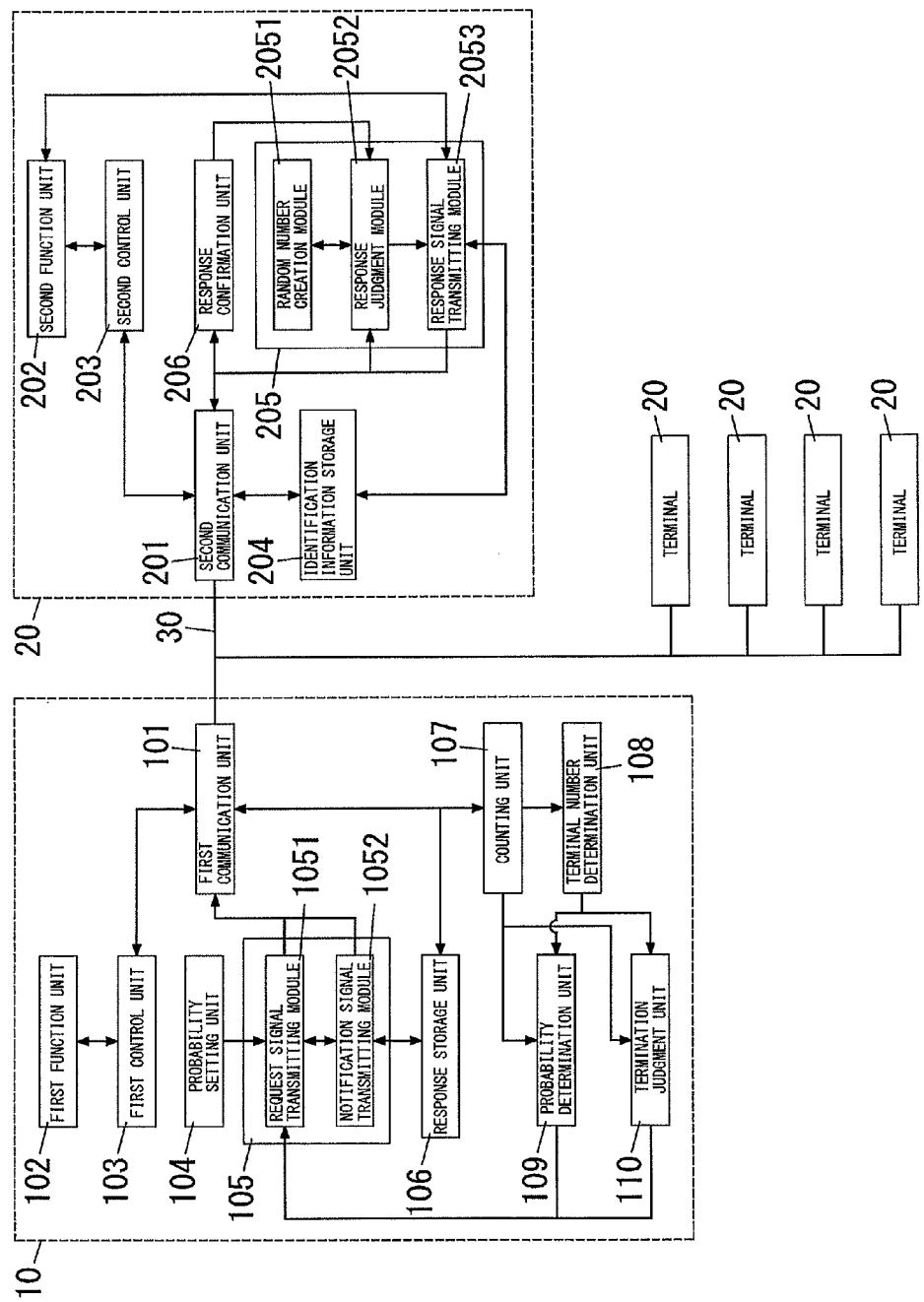
FIG. 1 is a diagram illustrating a configuration of the network system of the first embodiment.

FIG. 1 shows a configuration of the network system of the present embodiment. The network system of the present embodiment includes a controller (multicast terminal device) 10 and a plurality of terminals 20 connected to the controller 10 via a network 30. In the present network system, plural terminal devices (the controller 10 and terminals 20) are connected to the network 30, and communicate with each other. For example, each of the controller 10 and terminals 20 comprises a microcomputer including such as a memory, a processor, and an interface adapted in use to be connected to the network 30. Besides, the network 30 may be a wired network or a wireless network.

The controller 10 is configured to monitor and control each of the terminals 20. In more detail, the controller 10 sends a request signal (response requesting command) 40 to each of the terminals 20. The request signal 40 is a multicast packet such as a request signal for controlling the terminal 20, a request signal for obtaining a status of the terminal 20, and a request signal for changing setting values of the terminal 20. Upon receiving the request signal 40, the terminal 20 performs processing corresponding to a content of the received request signal 40. Further, the terminal 20 sends a response signal 50 to the controller 10. The response signal 50 is such as a control completion response signal indicating completion of control, a status announcing response signal including status data, and a setting completion response signal indicating completion of change of settings. The controller 10 receives the response signals 50 from each terminal 20.

The controller 10 includes a first communication unit 101, a first function unit 102, and a first control unit 103. Further, the controller 10 includes a probability setting unit 104, a request unit 105, a response storage unit 106, a counting unit 107, a terminal number determination unit 108, a probability determination unit 109, and a termination judgment unit 110.

The first communication unit 101 is a network interface for communicating with the terminals 20 via the network 30. The first communication unit 101 is configured to store address information peculiar to the controller 10. The first communication unit 101 establishes network communication by use of the stored address information. For example, the address information is an IP address and a physical address (MAC address).

The first function unit 102 is configured to execute processing (operation) for a service (function of the controller 10) to be provided by the controller 10. In the present embodiment, the first function unit 102 communicates with the terminals 20 via the network 30, thereby monitoring and controlling the terminals 20.

The terminal 20 may be lighting apparatus or air conditioning apparatus. The lighting apparatus is configured to turn on and off lighting equipment and to dim the lighting equipment. The air conditioning apparatus is configured to drive air conditioning equipment.

Each of the terminals 20 includes a second communication unit 201, a second function unit 202, and a second control unit 203. Each of the terminals 20 further includes an identification information storage unit 204, a response unit 205, and a response confirmation unit 206.

The identification information unit 204 is configured to store identification information uniquely allocated to the terminal 20. The For example, the identification information is address information peculiar to the terminal 20. The address information is an IP address and a physical address (MAC address), for example. The identification information may be defined as information uniquely assigned to the terminal 20, or information for distinguishing between the terminals 20.

The second communication unit 201 is a network interface for communicating with the controller 10 via the network 30. The second communication unit 201 establishes the network communication by use of the identification information stored in the identification information storage unit 204.

The second function unit 202 is configured to execute processing (operation) for a service (function of the terminal 20) to be provided by the terminal 20. The second function unit 202 is a target to be controlled or monitored by the controller 10. When the terminal 20 is lighting apparatus, the second function unit 202 is a lighting means for turning on and off and diming a lighting load (lighting equipment). When the terminal 20 is air conditioning apparatus, the second function unit 202 is an air conditioner controlling means for controlling air conditioning equipment to regulate a room temperature.

For the purpose of giving an object server function to the first and second control units 103 and 203, each of the first and second control units 103 and 203 is provided with a software module including objects which are used to perform processing for providing a service.

Each object has one or more interfaces (input output definition). The interface defines control information or monitoring information (e.g., a variable, function, event information, and a combination thereof) corresponding to the service to be provided by the function unit 102 or 202 (the service to be provided by the controller 10 or the terminal 20).

The object has an object unique identifier (referred to as "OID", if necessary) uniquely. The interface has an interface identifier (referred to as "IID", if necessary) uniquely. There is a specific identifier which is allocated to a combination of the object and the interface. In the following, a content of the specific identifier is expressed as [OID+IID].

The first control unit 103 functions as an object controlling means and a response signal sending means. The second control unit 203 functions as a request signal sending means configured to create the request signal using the specific identifier and send the created request signal.

The object controlling means is configured to, upon receiving the request signal using the specific identifier, operate the object in response to the contents of the request signal to provide the control information to the function unit 102. In addition, the object controlling means is configured to perform processing of obtaining the monitoring information from the function unit 102. The object controlling means is configured to perform processing of obtaining information regarding the object. The object controlling means is configured to perform processing of providing a function for indicating operation to the function unit 102. The object controlling means is configured to perform processing of obtaining the variable indicating the current status of the function unit 102. The object controlling means is configured to perform processing of obtaining the event information indicating change in the status of the function unit 102.

The response signal sending means is configured to send the response signal to the terminal device which is the sender of the request signal. The response signal includes a result of the processing executed by the object controlling means.

Figure 2:
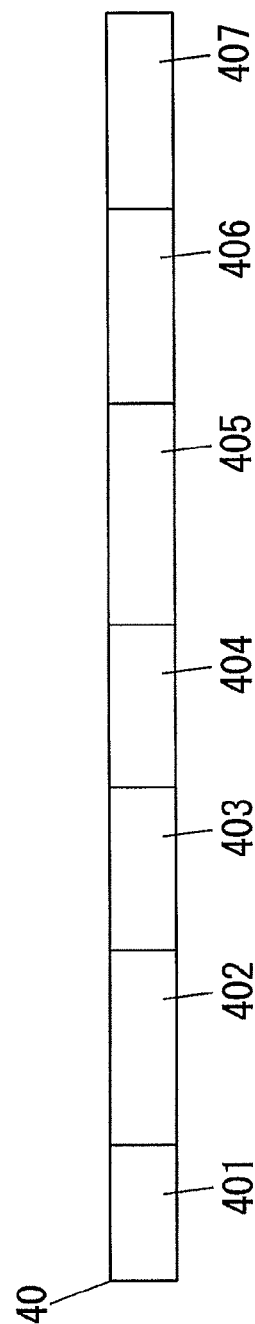
FIG. 2 is a diagram illustrating a configuration of a request signal in the network system of the first embodiment.

FIG. 2 shows a configuration of the request signal 40. The request signal 40 includes an operation code 401, the interface identifier 402, and the object unique identifier 403. The operation code 401 denotes the type of the response requesting command. The interface identifier 402 denotes the service (function) provided by the terminal device. The object unique identifier 403 denotes the control target or the monitoring target. Further, the request signal 40 may include a parameter 407 depending on the type of the operation code 401. When the terminal 20 has the object having the specific identifier identified by the interface identifier 402 and the object unique identifier 403 included in the request signal 40, the terminal 20 receives the request signal 40 via the second communication unit 201.

The request signal 40 includes probability information 404, sender identification information (request terminal ID) 405, and a request number (request ID) 406, in addition to the aforementioned operation code 401, the interface identifier 402, and the object unique identifier 403.

The sender identification information 405 designates an address of the controller 10 sending the request signal 40. The request number 406 indicates an ID number assigned to the request signal 40. The request number 406 is incremented by one for each creation of the request signal 40. When the request signal 40 is retransmitted, the request signal 40 includes the same ID number as that of the previous request signal 40. Besides, the request signal 40 may include a parameter 407 depending on the type of the operation code 401. The probability information 404 indicates a predetermined probability (response probability).

For example, the operation code 401 includes "Watch", "Get", "Set", and "Invoke". The operation code "Watch" is used to request a search for determining whether or not the object having the OID and IID designated by the request signal 40 is present in the network 30. The operation code "Get" is used to request to obtain a value of the object having the OID and IID designated by the request signal 40. The operation code "Set" is used to request to set a value to the object having the OID and IID designated by the request signal 40. The operation code "Invoke" is used to request to execute the object having the OID and IID designated by the request signal 40 to provide the control information to the function unit 202.

A wildcard "*" is available in the request signal 40. The wildcard denotes any of OIDs or IIDs. For example, when the controller 10 sends the request signal having the object unique identifier 403 of "*", the interface identifier 402 of "*", and the operation code 401 of "Watch", all of the terminals 20 receives the request signal, and sends the response signal including the combination of the object and the interface to the controller 10.

For example, the controller 10 sends the request signal in which only the interface identifier 402 is the wildcard "*" and the operation code 401 denotes the "Watch". Upon receiving the request signal, the terminal 20 sends, to the controller 10, the response signal including the combination of the OID designated by the request signal and the interface of the OID designated by the request signal.

For example, the controller 10 sends the request signal in which only the object unique identifier 403 is the wildcard "*" and the operation code 401 denotes the "Watch". Upon receiving the request signal, the terminal 20 sends, to the controller 10, the response signal including the combination of the IID designated by the request signal and the OID including the IID designated by the request signal.

In the present embodiment, using the wildcard "*" as the object unique identifier 403 of the request signal 40 enables multicast communication.

Figure 3:
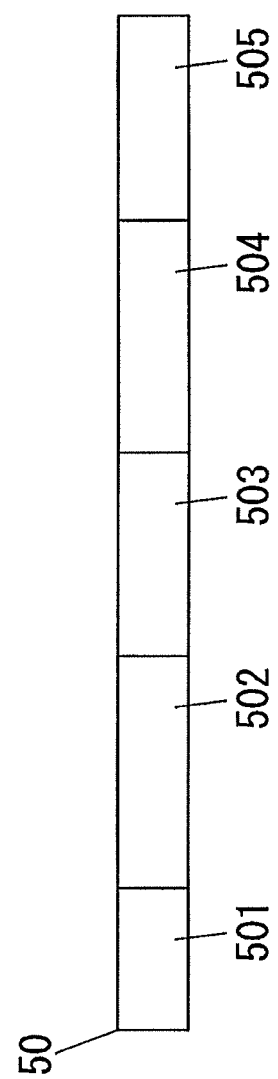
FIG. 3 is a diagram illustrating a configuration of a response signal in the network system of the first embodiment.

FIG. 3 illustrates the response signal 50. The response signal 50 includes an operation code 501 and sender identification information (request terminal ID) 502, a request number (request ID) 503, and a terminal identification information 504. The operation code 501 denotes the type of the response signal 50. The terminal identification information 504 denotes the identification information (in the present embodiment, the address of the terminal 20) of the terminal 20 stored in the identification information storage unit 204. Further, the response signal 50 may include a specific parameter 505 depending on the type of the operation code 501. The sender identification information 502 denotes an address of the controller 10 which is indicated by the sender identification information 405 included in the request signal 40. The request number 503 denotes an ID number same as that indicated by the request number 406 included in the request signal 40.

For example, upon receiving the request signal 40 having the operation code 401 of "Watch", the terminal 20 sends the response signal 50 having the operation code 501 of "Provide". In this instance, the response signal 50 includes the parameter 505 which denotes the combination of the object unique identifier and the interface identifier which are designated by the request signal 40.

Besides, the plural objects may have the interface (i.e., the interface having the same IID) which has the same definition corresponding to the service provided by the terminal device.

An OSI 7-layer model is used as the protocol for the network system of the present embodiment. As an application layer of the uppermost layer, a unique object access protocol (OAP) is used to give and receive the information such as the variable, the function and the event information between software modules of the controller 10 and the terminal 20.

The request unit 105 multicasts the request signal including the probability information 404 indicative of the predetermined probability (response probability) via the first communication unit 101. Upon receiving the response signal 50 via the first communication unit 101, the request unit 105 sends, in a unicast manner, a notification signal 60 via the first communication unit 101 to the terminal 20 which has sent the response signal 50. The notification signal 60 announces that the terminal 20 has responded to the controller 10 (completion of a response). In addition, the request unit 105 is configured to prepare the next request signal 40 including the probability information 404 indicative of the probability not less than that indicated by the probability information 404 included in the previous request signal 40. Preferably, the request unit 105 is configured to increase the response probability each time sending the request signal 40 via the first communication unit 101.

In the present embodiment, the request unit 105 includes request signal transmitting module 1051 and a notification signal transmitting module 1052.

The request signal transmitting module 1051 is configured to repeat sending the request signal 40 to the plurality of the terminals 20 via the first communication unit 101. In other words, the request signal 40 is multicast.

The probability setting unit 104 is an input device for inputting the response probability. The response probability defines a probability that the terminal 20 sends the response signal 50 in response to receiving the request signal 40. In other words, the response probability defines a probability that upon receiving the request signal 40 the terminal 20 performs operation corresponding to the operation code 401 of the request signal 40 and sends the response signal 50 to the controller 10. The response probability is in the range of 0 to 100[%]. When the response probability is 100[%], the terminal 20 is sure to send the response signal 50. When the response probability is 50[%], the terminal 20 sends the response signal 50 at the probability of 50[%].

The response probability is determined on the basis of a maximum number (maximum simultaneous reception number) of the response signals 50 which the first communication unit 101 can receive simultaneously, so as to allow the first communication unit 101 to receive the response signals 50 respectively from all of the terminals 20 within a predetermined time period starting from the time of sending the request signal 40. The maximum simultaneous reception number varies in accordance with access control performed in a communication transport (transport) of the network 30. For example, in CSMA/CA communication, the maximum simultaneous reception number varies in accordance with accuracy of carrier sense, a backoff method for the carrier sense, a length of backoff time, or the retransmission number.

The response probability is set to a sufficiently-small value (e.g., 10%) in consideration of the communication transport of the network 30, in order to allow the controller 10 to receive all of the response signals 50 respectively sent from the terminals without causing no packet loss in transmitting the response signals 50.

The response unit 205 is configured to, upon receiving the request signal 40 via the second communication unit 201, send the response signal 50 to the controller 10 via the second communication unit 201 at the response probability indicated by the probability information 404 included in the request signal 40. The response unit 205 functions as the object controlling means and the response signal sending means.

The response unit 205 includes a random number creation module 2051, a response judgment module 2052, and a response signal transmitting module 2053.

The random number creation module 2051 is configured to create a random number within the range of 0 to 100. The random number creation module 2051 provides the resultant random number to the response judgment module 2052.

The response judgment number 2052 is configured to, upon receiving the request signal 40 via the second communication unit 201, request the random number creation module 2051 to create the random number. The response judgment module 2052 is configured to, upon obtaining the random number from the random number creation module 2051, compare the random number obtained from the random number creation module 2051 with the response probability indicated by the probability information 404 included in the request signal 40. The response judgment module 2052 determines to send the response signal 50 when the random number is less than the response probability. The response judgment module 2052 determines not to send the response signal 50 when the random number is not less than the response probability.

When the response judgment module 2052 determines to send the response signal 50, the response signal transmitting module 2053 operates the object designated by the operation command 401 of the request signal 40, and sends the response signal 50. When the response judgment module 2052 determines not to send the response signal 50, the response signal transmitting module 2053 does not operate the object designated by the operation command 401 of the request signal 40 and send the response signal 50, too.

The response storage unit 106 is configured to, upon receiving the response signal 50 via said first communication unit 101, store the identification information indicated by the terminal identification information 504 included in the response signal 50 received via the first communication unit 101. The response storage unit 106 stores identification information indicated by the terminal identification information 504 of the response signal 50 which has received at the first communication unit 101 within a predetermined time period starting from the time of sending the request signal 40 via the first communication unit 101.

The counting unit 107 is configured to count the response signals 50 which the first communication unit 101 has received. The counting unit 107 counts the response signals 50 received by the first communication unit 101 until the predetermined time period (response waiting time period) elapses from the time at which the first communication unit 101 sends the request signal 40. The predetermined time period is defined to be a predetermined range within which the controller 10 receives the response signals 50 respectively from the terminals 20 which have responded to the request signal 40. After a lapse of the predetermined time period, the counting unit 107 provides the number of the response signals 50 to the terminal number determination unit 108.

The terminal number determination unit 108 is configured to determine a maximum number (total number) of the terminals 20 responding to the controller 10 on the basis of the response probability indicated by the probability information 404 included in the request signal 40 and the number of the response signals 50 obtained from the counting unit 107. In the present embodiment, the terminal number determination unit 108 determines the total number of the terminals 20 responding to the request signal 40 (hereinafter, referred to as "first request signal 41", if necessary) which the controller 10 sends first. The terminal number determination unit 108 does not determine the total number of the terminals 20 responding to the request signal 40 (hereinafter, referred to as "second request signal 42", if necessary) which the controller 10 retransmits.

The terminal number determination unit 108 is configured to determine the maximum number (total number) of the terminals 20 responding to the controller 10 on the basis of the response probability (hereinafter referred to as "first response probability", if necessary) indicated by the probability information 404 included in the first request signal 41 and the number of the response signals 50 obtained from the counting unit 107. In other words, the terminal number determination unit 108 determines the maximum number of the terminals 20 which send the response signal 50 to the controller 10 in response to receiving the first request signal 41. The terminal number determination unit 108 is configured to determine the total number of the terminals 20 on the basis of a quotient of the number of the response signals 50 obtained from the counting unit 107 and the response probability (first response probability) of the probability information 404 included in the first request signal 41. In the present embodiment, the unit of the response probability is [%]. The terminal number determination unit 108 calculates the total number of the terminals 20 by multiplying 100 by the quotient obtained by dividing the number of the response signals 50 obtained from the counting unit 107 by the first response probability. For example, when the first response probability is 10[%] and the number of the response signals 50 is 10, the total number of the terminals 20 is 100.

The probability determination unit 109 is configured to determine the response probability (hereinafter referred to as "second response probability", if necessary) on the basis of the total number of the terminals 20 determined by the terminal number determination unit 108. The second response probability is used for preparing the second request signal 42 to be sent next time. The probability determination unit 109 determines the number of the terminals 20 which have not responded to the request signal 40 (have not sent the response signal 50). In other words, the probability determination unit 109 determines the remaining number of the terminals 20. The probability determination unit 109 determines the remaining number of the terminals 20 by subtracting the number of the response signals 50 obtained from the counting unit 107 from the total number of the terminals 20 determined by the terminal number determination unit 108. The probability determination unit 109 determines the response probability (second response probability) on the basis of the remaining number of the terminals 20 and the maximum simultaneous reception number of the first communication unit 101. The probability determination unit 109 selects the new response probability within a range of the current response probability (response probability notified the terminal 20 of) to a maximum probability. The maximum probability is defined to be the maximum simultaneous reception number of the first communication unit 101 divided by the remaining number of the terminals 20 and multiplied by 100. For example, when the total number of the terminals 20 determined by the terminal number determination unit 108 is 100 and the number of the response signals 50 obtained from the counting unit 107 is 10 and the maximum simultaneous reception number of the first communication unit 101 is 20, the maximums probability is 22.222 . . . [%]. When the current response probability is 10 [%], the next response probability is selected within the range of 10 to 22.222 . . . [%]. A higher response probability is preferred for improvement of the communication efficiency. Therefore, the probability determination unit 109 sets the response probability to 22[%].

Once after determining the response probability, the probability determination unit 109 calculates the remaining number of the terminals 20 by subtracting the accumulated total number of the response signals 50 obtained from the counting unit 107 from the total number of the terminals 20 determined by the terminal number determination unit 108. For example, when the total number of the terminals 20 responding to the first response signal 41 (i.e., the number of the response signals 50 obtained within the response waiting time period starting from the time of sending the first request signal 41) is 10, and the total number of the terminals 20 responding to the second response signal 41 (i.e., the number of the response signals 50 obtained before the response waiting time period elapses from the time of sending the second request signal 42) is 9, and the total number of the terminals 20 determined by the terminal number determination unit 108 is 100, the remaining number of the terminals 20 is 81.

In theory, the number of the terminals 20 decreases each time the request signal 40 is sent. The maximum simultaneous reception number of the first communication unit 101 is constant. Therefore, the response probability increases each time the request signal 40 is sent. The probability determination unit 109 terminates processing of determining the response probability when the probability determination unit 109 selects 100[%] as the response probability.

The termination judgment unit 110 is configured to judge whether or not the controller 10 has received the response signals 50 respectively from all of the terminals 20 responding to the request signal 40 on the basis of the total number of the terminals 20 determined by the terminal number determination unit 108 and the number of the response signals 50 obtained from the counting unit 107. The termination judgment unit 110 determines that the controller 10 has received the response signals 50 respectively from all of the terminals 20 responding to the request signal 40, upon acknowledging that the remaining number of the terminals 20 is 0. Like the probability determination unit 109, the termination judgment unit 110 calculates the remaining number of the terminals 20 by subtracting the accumulated total number of the response signals 50 obtained from the counting unit 107 from the total number of the terminals 20 determined by the terminal number determination unit 108. The termination judgment unit 110 sends a termination notifying signal to the request unit 105 (request signal transmitting module 1051) upon acknowledging that the remaining number of the terminals 20 is 0.

The request signal transmitting module 1051 is configured to, once after the probability determination unit 109 determines the response probability, create the request signal 40 including the probability information 404 indicative of the response probability determined by the probability determination unit 109. The request signal transmitting module 1051 adopts the response probability set by the probability setting unit 104 as the response probability of the request signal 40 which the request signal transmitting module 1051 transmits first. That is, the probability information 404 of the first request signal 41 indicates the response probability (first response probability) set by the probability setting unit 104. The request signal transmitting module 1051 adopts the response probability determined by the probability determination unit 109 as the response probability of the request signal 40 which the request signal transmitting module 51 retransmits. That is, the probability information 404 of the second request signal 42 indicates the response probability (second response probability) determined by the probability determination unit 109.

The request signal transmitting module 1051 terminates repeating sending the request signal 40 via the first communication unit 101 upon receiving the termination notifying signal from the termination judgment unit 110. In other words, the request unit 105 terminates repeating sending the request signal 40 via the first communication unit 101 upon acknowledging that the termination judgment unit 110 has judged that the response signals 50 are respectively obtained from all of the terminals 20 responding to the request signal 40.

Figure 4:
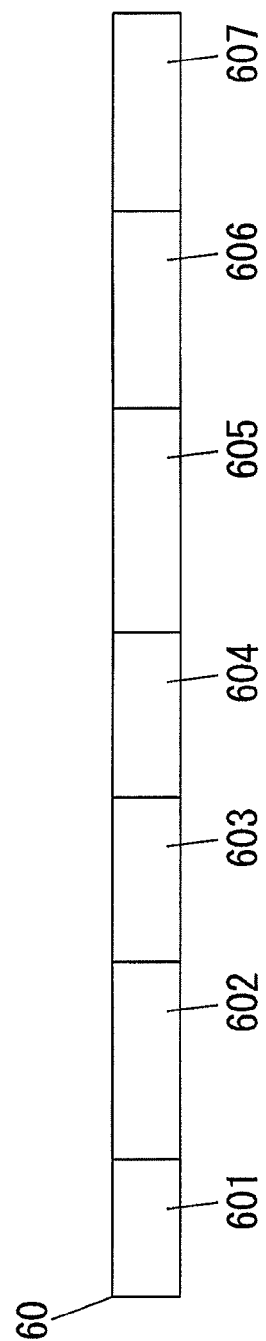
FIG. 4 is a diagram illustrating a configuration of a notification signal in the network system of the first embodiment.

Upon receiving the response signal 50 via the first communication unit 101, the notification signal transmitting module 1052 sends, via the first communication unit 101, the notification signal 60 to the terminal 20 designated by the identification information stored in the response storage unit 106. The notification signal 60 includes, as shown in FIG. 4, destination information 603, sender identification information 605, and a request number 606, in addition to an operation code 601, an interface identifier 602, and an object unique identifier 603.

The destination information 604 indicates the identification information of the terminal 20 being the destination of the notification signal 60. The terminal 20 receives the notification signal 60, upon acknowledging that the identification information indicated by the destination information 604 of the notification signal 60 is identical to the identification information stored in the identification information storage unit 204. In other words, the notification signal 60 is received by only the terminal 20 which has sent the response signal 50 in response to the request signal 40.

Besides, the notification signal 60 may include a specific parameter 607 depending on the type of the operation code 601. The sender identification information 605 indicates the address of the controller 10 same as that indicated by the sender identification information 502 included in the response signal 50. The request number 606 indicates the ID number same as that indicated by the request number 503 included in the response signal 50. The notification signal 60 need include at least the destination information 604, and a message (i.e., the sender identification information 605 and the request number 606) for identifying the notification signal 60.

The request unit 105 multicasts the request signal 40 via the first communication unit 101. Upon receiving the response signal 50 via the first communication unit 101, the request unit 105 sends, in a unicast manner, the notification signal 60 to the terminal 20 which has sent the response signal 50. Thereafter, the request unit 105 multicasts, via the first communication unit 101, the request signal 40 having the response probability higher than that of the request signal 40 which has been sent previous time. Upon receiving the response signal 50 via the first communication unit 101, the request unit 105 sends, in a unicast manner, the notification signal 60 to the terminal 20 which has sent the response signal 50. Until the request unit 105 receives the response signals 50 respectively from all of the terminals 20, the request unit 105 sends the request signal 40 and the notification signal 60 alternately via the first communication unit 101.

The response confirmation unit 206 is configured to, upon receiving the notification signal 60 via the second communication unit 201, judge whether or not the response has been completed, on the basis of the notification signal 60. In the present embodiment, the response confirmation unit 206 is configured to judge that the response has been completed (the terminal 20 has responded to the controller 10), upon receiving the notification signal 60 via the second communication unit 201.

The response judgment module 2052 is configured not to send the request signal 40 via the second communication unit 201 in response to receiving the request signal 40 via the second communication unit 201, once after the response confirmation unit judges that the response has been completed. That is, once after the terminal 20 receives the notification signal 60, the terminal 20 does not send the response signal 50 even if the terminal 20 receives the request signal 40 from the controller 10.

Besides, upon receiving the notification signal 60, the terminal 20 stores the sender identification information 605 and the request number 606 included in the notification signal 60. Thus, the terminal 20 acknowledges that the response signal 50 transmitted in response to the request signal 40 has been successfully received by the controller 10.

Figure 5:
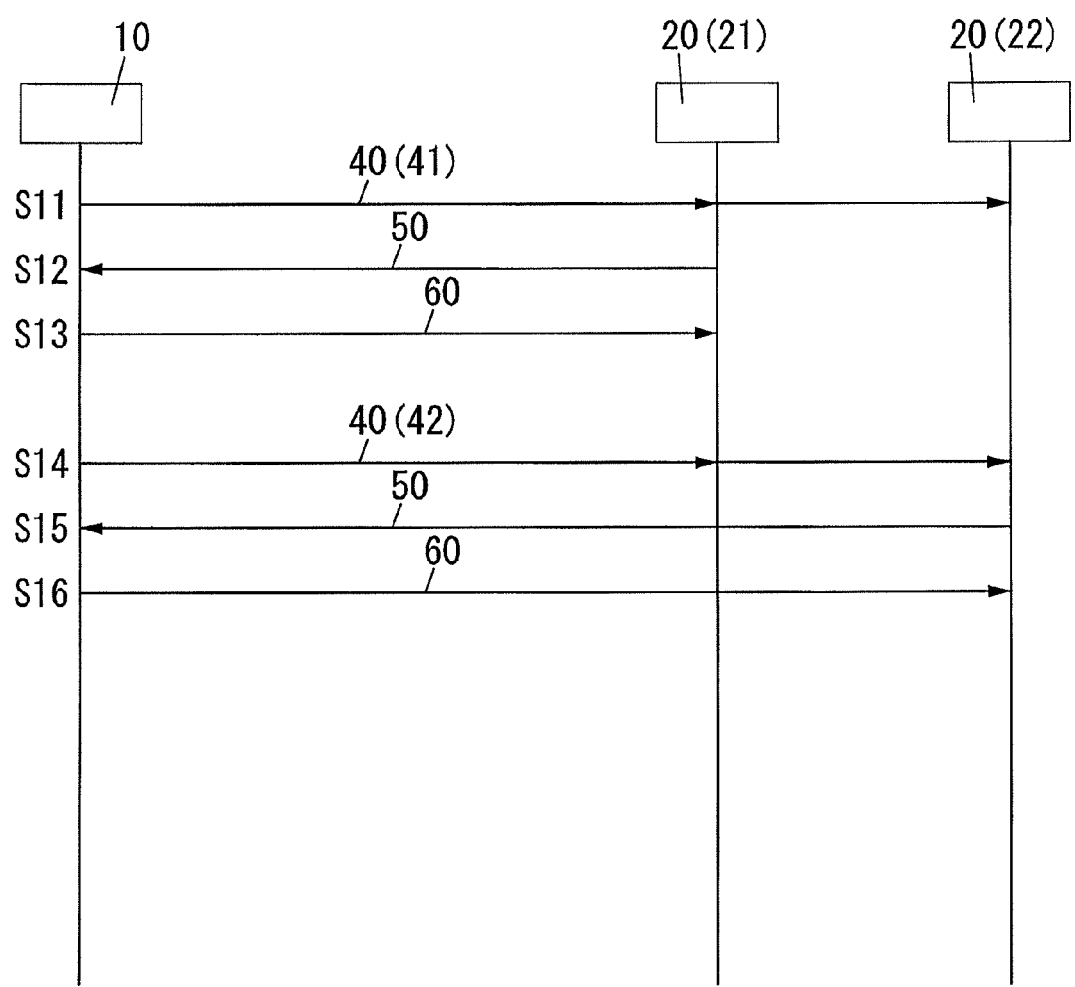
FIG. 5 is a sequence diagram illustrating operation of the network system of the first embodiment.

Next, an explanation referring to FIG. 5 is made to operation of the network system of the present embodiment. In the following explanation, in order to distinguish between the plural terminals 20, the terminals 20 are respectively designated by use of reference numerals 21 and 22, if necessary. The terminal 21 includes the object having the object unique identifier "OID1". The object having "OID1" includes interfaces respectively having the interface identifiers "IID5" and "IID7". The terminal 22 includes the object having the object unique identifier "OID2". The object having "OID2" includes interfaces respectively having the interface identifiers "IID3" and "IID7".

As to the controller 10, the request unit 105 controls the first communication unit 101, thereby multicasting the first request signal 41 to the terminals 21 and 22 (S11). For example, the first request signal 41 includes the operation code 401 of "Watch", the object unique identifier 403 of "k", the interface identifier 402 of "IID7", the probability information 404 indicating the response probability of "50%", the sender identification information 405 indicating the address of the controller 10, and the request number 406 indicating "0001".

Only the terminals 21 and 22 including the interface having the interface identifier "IID7" receive the first request signal 41. Upon receiving the first request signal 41, the terminal 20 sends the response signal 50 at the response probability indicated by the probability information 404 of the first request signal 41. In the instance shown in FIG. 5, the maximum number of the terminals 20 sending the response signal 50 in response to the first request signal 41 (i.e., the number of the terminals 20 including the interface having the interface identifier "IID7") is 2. The response probability (first response probability) indicated by the probability information 404 of the first request signal 41 is 50%. In theory, one terminal 20 sends the response signal 50. In the instance shown in FIG. 5, only the terminal 21 sends the response signal 50 (S12) but the terminal 22 sends no response signal 50.

As to the response signal 50, the operation code 501 is "Provide". The sender identification information 502 indicates the address of the controller 10. The request number indicates "0001". The terminal identification information 504 denotes the identification information (address) of the terminal 20 being the sender of the response signal 50. The parameter 505 is the combination of the interface identifier "IID7" and the object unique identifier associated with the interface identifier "IID7". For example, the terminal 21 transmits the response signal 50 including the parameter 505 indicating the combination of the interface identifier "IID7" and the object unique identifier "OID1". The terminal 22 transmits the response signal 50 including the parameter 505 indicating the combination of the interface identifier "IID7" and the object unique identifier "OID2".

In the controller 10, the response storage unit 106 stores the identification information (identification information of the terminal 21) indicated by the terminal identification information 504 included in the response signal 50 received by the first communication unit 101. Thereafter, the request unit 105 controls the first communication unit 101, thereby sending the notification signal 60 to the terminal 21 in a unicast manner (S 13).

The identification information indicated by the destination information 604 of the notification signal 60 is identical to the identification information of the terminal 21. Therefore, only the terminal 21 receives the notification signal 60. When the terminal 21 receives the notification signal 60, the response confirmation unit 206 judges that the terminal 20 has already responded to the controller 10. Thereafter, the terminal 21 sends no response signal 50 even upon receiving the request signal 40.

In the controller 10, the counting unit 107 counts the response signals 50 which the first communication unit 101 receives within the response waiting time period starting from the time of sending the first request signal 41. The terminal number determination unit 108 determines the maximum number of the terminals 20 sending the response signal 50 in response to receiving the first request signal 41 on the basis of the number of the response signals 50 obtained from the counting unit 107 and the response probability (first response probability). In other words, the terminal number determination unit 108 determines the maximum number of the terminals 20 including the interface having the interface identifier "IID7". In the instance shown in FIG. 5, only the terminal 21 sends the response signal 50. Therefore, the terminal number determination unit 108 uses, as the total number of the terminals 20, a value (=2) calculated by multiplying 100 by a quotient (=0.02) of the number (=1) of the response signals 50 received by the first communication unit 101 and the response probability (=50[%]).

The probability determination unit 109 uses, as the remaining number of the terminals 20, a value (=1) calculated by subtracting the number (=1) of the response signals 50 obtained from the counting unit 107 from the total number (=2) of the terminals 20 determined by the terminal number determination unit 108. The probability determination unit 109 determines the new response probability in the range of the current response probability (50[%]) to the probability (=100[%]) calculated by dividing the maximum simultaneous reception number (=1) of the first communication unit 101 by the remaining number (=1) of the terminals 20 and multiplying by 100. For example, the probability determination unit 109 selects 100 [%] as the response probability.

The terminal number determination unit 108 determines that the total number of the terminals 20 is 2. The accumulated number of the response signals 50 obtained from the counting unit 107 is 1. Therefore, the remaining number of the terminals 20 is 1. In this instance, since the remaining number of terminals 20 is 1, the termination judgment unit 110 does not send the termination notifying signal to the request unit 105.

Once after the probability determination unit 109 determines the response probability, the request unit 105 creates the second request signal 42 which includes the probability information 404 indicative of the second response probability (=100[%]) determined by the probability determination unit 109. With the exception of the response probability indicated by the probability information 404, the second request signal 42 is same as the first request signal 41. The second request signal 42 is multicast to the terminals 21 and 22 (S14).

Only the terminals 21 and 22 including the interface having the interface identifier "IID7" receives the second request signal 42. Since the terminal 21 has received the notification signal 60, the terminal 21 does not send the response signal 50 in response to receiving the second request signal 42. Upon receiving the second request signal 42, the terminal 22 sends the response signal 50 at the response probability indicated by the probability information 404 of the second request signal 42. The second request signal 42 includes the probability information 404 indicative of the response probability of 100%. The terminal 22 is sure to send the response signal surely (S15).

In the controller 10, the response storage unit 106 stores the identification information (identification information of the terminal 22) indicated by the terminal identification information 504 included in the response signal 50 received by the first communication unit 101. Thereafter, the request unit 105 controls the first communication unit 101, thereby sending the notification signal 60 to the terminal 22 in a unicast manner (S16).

The identification information indicated by the destination information 604 included in the notification signal 60 is identical to the identification information of the terminal 22. Therefore, only the terminal 22 receives the notification signal 60. The terminal 22 once receiving the notification signal 60 sends no response signal 50 even upon receiving the request signal 40.

In the controller 10, the counting unit 107 counts the response signals 50 received by the first communication unit 101 within the response waiting time period starting from the time of sending the second request signal 42. In the instance shown in FIG. 5, only the terminal 22 sends the response signal 50. Therefore, the number of the response signals 50 received by the first communication unit 101 is 1.

The terminal number determination unit 108 determines that the total number of the terminals 20 is 2. The accumulated number of the response signals 50 obtained from the counting unit 107 is 2. Therefore, the remaining number of the terminals 20 is 0. In this instance, the termination judgment unit 110 sends the termination notifying signal to the request unit 105.

Upon receiving the termination notifying signal from the termination judgment unit 110, the request unit 105 terminates repeating sending the request signal 40 via the first communication unit 101.

With respect to the present embodiment, the following explanation is made to operation of the network system in which the maximum simultaneous reception number of the first communication unit 101 is 10 and the total number of the terminals 20 responding to the request signal 40 is 50.

When the response probability (first response probability) of 20[%] is set by use of the probability setting unit 104, the controller 10 multicasts the first request signal 41 including the probability information 404 indicative of the response probability of 20%. The total number of the terminals 20 is 50. In theory, each of the ten terminals 20 sends the response signal 50. The controller 10 sends the notification signal 60 to each of the terminals 20 which have sent the response signal 50. Once after the terminal 20 has received the notification signal 60, the terminal 20 sends no response signal in response to receiving the request signal 40. Since the controller 10 receives the response signals 50 respectively sent from the ten terminals 20, the number of the response signals 50 counted by the counting unit 107 is 10. The terminal number determination unit 108 refers to the number (=10) of the response signals 50 counted by the counting unit 107 and the response probability (=20[%]) indicated by the probability information 404 of the first request signal 41, and determines that the total number of the terminal 20 is 50. The probability determination unit 109 refers to the total number (=50) of the terminals 20 determined by the terminal number determination unit 108 as well as the accumulated number (=10) of the response signals 50 counted by the counting unit 107, and calculates the remaining number (=40) of the terminals 20. The probability determination unit 109 refers to the remaining number (=40) of the terminals 20, the response probability (=20[%]) indicated by the probability information of the first request signal 41, and the maximum simultaneous reception number (=10) of the first communication unit 101, and selects 25% as the second response probability. Since the remaining number of the terminals 20 is not 0, the termination judgment unit 110 sends no termination notifying signal to the request unit 105.

Subsequently, the controller 10 multicasts the second request signal 42 including the probability information 404 indicative of the second response probability of 25%. The remaining number of the terminals 20 is 40. In theory, each of the ten terminals 20 sends the response signal 50. The controller 10 sends the notification signal 60 to each of the terminals 20 which have sent the response signal 50. Once after the terminal 20 has received the notification signal 60, the terminal 20 sends no response signal in response to receiving the request signal 40. Since the controller 10 receives the response signals 50 respectively sent from the ten terminals 20, the number of the response signals 50 counted by the counting unit 107 is 10. The probability determination unit 109 refers to the total number (=50) of the terminals 20 determined by the terminal number determination unit 108 as well as the accumulated number (=20) of the response signals 50 counted by the counting unit 107, and calculates the remaining number (=30) of the terminals 20. The probability determination unit 109 refers to the remaining number (=30) of the terminals 20, the response probability (=25[%]) indicated by the probability information of the previous request signal 40, and the maximum simultaneous reception number (=10) of the first communication unit 101, and selects 33% as the second response probability. Since the remaining number of the terminals 20 is not 0, the termination judgment unit 110 sends no termination notifying signal to the request unit 105.

Thereafter, the controller 10 multicasts the second request signal 42 including the probability information 404 indicative of the second response probability of 33%. The remaining number of the terminals 20 is 30. In theory, each of the ten terminals 20 sends the response signal 50. The controller 10 sends the notification signal 60 to each of the terminals 20 which have sent the response signal 50. Once after the terminal 20 has received the notification signal 60, the terminal 20 sends no response signal in response to receiving the request signal 40. Since the controller 10 receives the response signals 50 respectively sent from the ten terminals 20, the number of the response signals 50 counted by the counting unit 107 is 10. The probability determination unit 109 refers to the total number (=50) of the terminals 20 determined by the terminal number determination unit 108 as well as the accumulated number (=30) of the response signals 50 counted by the counting unit 107, and calculates the remaining number (=20) of the terminals 20. The probability determination unit 109 refers to the remaining number (=20) of the terminals 20, the response probability (=33[%]) indicated by the probability information of the previous request signal 40, and the maximum simultaneous reception number (=10) of the first communication unit 101, and selects 50% as the second response probability. Since the remaining number of the terminals 20 is not 0, the termination judgment unit 110 sends no termination notifying signal to the request unit 105.

After that, the controller 10 multicasts the second request signal 42 including the probability information 404 indicative of the second response probability of 50%. The remaining number of the terminals 20 is 20. In theory, each of the ten terminals 20 sends the response signal 50. The controller 10 sends the notification signal 60 to each of the terminals 20 which have sent the response signal 50. Once after the terminal 20 has received the notification signal 60, the terminal 20 sends no response signal in response to receiving the request signal 40. Since the controller 10 receives the response signals 50 respectively sent from the ten terminals 20, the number of the response signals 50 counted by the counting unit 107 is 10. The probability determination unit 109 refers to the total number (=50) of the terminals 20 determined by the terminal number determination unit 108 as well as the accumulated number (=40) of the response signals 50 counted by the counting unit 107, and calculates the remaining number (=10) of the terminals 20. The probability determination unit 109 refers to the remaining number (=10) of the terminals 20, the response probability (=50[%]) indicated by the probability information of the previous request signal 40, and the maximum simultaneous reception number (=10) of the first communication unit 101, and selects 100% as the second response probability. Since the remaining number of the terminals 20 is not 0, the termination judgment unit 110 sends no termination notifying signal to the request unit 105.

Then, the controller 10 multicasts the second request signal 42 including the probability information 404 indicative of the second response probability of 100%. Since the response probability is 100%, all of the remaining terminals 20 send the response signals 50 respectively. The controller 10 sends the notification signal 60 to each of the terminals 20 which have sent the response signal 50. Once after the terminal 20 has received the notification signal 60, the terminal 20 sends no response signal in response to receiving the request signal 40. Since the controller 10 receives the response signals 50 respectively sent from the ten terminals 20, the number of the response signals 50 counted by the counting unit 107 is 10. The probability determination unit 109 refers to the total number (=50) of the terminals 20 determined by the terminal number determination unit 108 as well as the accumulated number (=50) of the response signals 50 counted by the counting unit 107, and calculates the remaining number (=0) of the terminals 20. Since the remaining number of the terminals 20 is 0, the termination judgment unit 110 sends the termination notifying signal to the request unit 105. Thereby, the request unit 105 terminates repeating sending the request signal 40 via the first communication unit 101.

As described in the above, the network system of the present embodiment includes the controller 10, and the plurality of terminals 20 connected to the controller 10 via the network 30. The controller 10 includes the first communication unit 101 configured to communicate with the terminals 20 via the network, the request unit 105, and the response storage unit 106. Each of the terminals 20 includes the second communication unit 201 configured to communicate with the controller 10 via the network 30, the identification storage unit 204 configured to store identification information assigned to the terminal 20, the response unit 205, and the response confirmation unit 206. The request unit 105 is configured to repeat sending the request signal 40 to the plurality of the terminals 20 via the first communication unit 101, the request signal 40 including the probability information 404 indicative of the predetermined probability (response probability). The response unit 205 is configured to, upon receiving the request signal 40 via the second communication unit 201, send the response signal 50 via the second communication unit 201 at the response probability indicated by the probability information 404 included in the request signal 40. The response signal 50 includes the terminal identification information 504 indicative of the identification information stored in the identification storage unit 204. The response storage unit 106 is configured to, upon receiving the response signal 50 via the first communication unit 101, store the identification information indicated by the terminal identification information included in the response signal 50. The request unit 105 is configured to refer to the identification information stored in the response storage unit 106, and send via the first communication unit the notification signal 60 announcing the completion of the response to the terminal 20 which has sent the response signal 50. The response confirmation unit 206 is configured to, upon receiving the notification signal 60 via the second communication unit 201, judges whether or not the response has been completed, on the basis of the notification signal 60. The response unit 205 is configured not to send the response signal 50 via the second communication unit 201 in response to receiving the request signal 40 via the second communication unit 201 once after the response confirmation unit 206 judges that the response has been completed. The request unit 105 is configured to prepare the next request signal 40 including the probability information 404 indicative of the response probability not less than that indicated by the probability information 404 included in the previous request signal 40.

Especially, in the network system of the present embodiment, the request unit 105 includes the request signal transmitting module 1051 and the notification signal transmitting module 1052. The request signal transmitting module 1051 is configured to control the first communication unit 101 in a manner to repeat sending the request signal 40 to the plurality of the terminals 20. The notification signal transmitting module 1052 is configured to control the first communication unit 101 in a manner to send the notification signal 60 to the terminal 20 having the identification information identical to that stored in the response storage unit 106, upon acknowledging that the first communication unit 101 has received the response signal 50. The response confirmation unit 206 is configured to judge that a response has sent to the controller 10, upon acknowledging that the second communication unit 201 has received the notification signal 60.

Accordingly, the network system of the present embodiment can decrease the number of the response signals 50 which are simultaneously sent from the terminals 20 when the request signal 40 is multicast. Consequently, even with the use of relatively low speed communication transport, the network system can be free from packet loss otherwise caused by the collision between the response signals 50.

Moreover, the controller 10 repeats sending the request signal 40. Once after sending the response signal 50 in response to the request signal 40, the terminal 20 sends no response signal 50 even upon reception of the request signal 40. Therefore, the controller 10 can successfully and efficiently receive the response signals 50 respectively from all of the terminals 20 which are entitled to receive the request signal 40. Besides, the present embodiment is still effective even if the controller 10 is arranged to receive and process only a small number of the packets.

In the network system of the present embodiment, the controller 10 further includes the counting unit 107, the terminal number determination unit 108, and the probability determination unit 109. The counting unit 107 is configured to count the response signals 50 received by the first communication unit 101 after the first communication unit 101 sends the request signal 40. The terminal number determination unit 108 is configured to determine the total number of the terminals 20 responding to the controller 10 on the basis of the response probability indicated by the probability information 404 included in the request signal 40 sent by the first communication unit 101 and the number of the response signals 50 obtained from the counting unit 107. The probability determination unit 109 is configured to determine the response probability on the basis of the total number of the terminals 20 determined by the terminal number determination unit 108. The request unit 105 is configured to create the request signal 40 including the probability information 404 indicative of the response probability determined by the probability determination unit 109.

Accordingly, the network system of the present embodiment can easily calculate the total number of the terminals 20 responding to the request signal 40. The controller 10 need not preliminarily store the total number of the terminals 20. Consequently, the network system can be flexible to modification of the system configuration (modification of the number of the terminals 20).

In the network system of the present embodiment, the controller 10 further includes the termination judgment unit 110. The termination judgment unit 110 is configured to judge whether or not the controller 10 has received the response signals 50 respectively from all of the terminals 20 responding to the request signal 40 on the basis of the total number of the terminals 20 determined by the terminal number determination unit 108 and the number of the response signals 50 obtained from the counting unit 107. The request unit 105 is configured to terminate repeating sending the request signal 40 via the first communication unit 101 upon acknowledging that the termination judgment unit 110 determines that the controller 10 has received the response signals 50 respectively from all of the terminals 20 responding to the request signal 40.

Accordingly, the network system of the present embodiment enables the controller 10 to successfully receive the response signal 50 from the terminal 20 responding to the request signal 40.

The network system of a modification of the present embodiment does not include the termination judgment unit 110. In the network system of the modification, the request unit 105 is configured to terminate repeating sending the request signal 40 via the first communication unit 101 upon sending the request signal 40 including the probability information indicative of the response probability of 100% via the first communication unit 101.

The network system of the modification can prevent unprofitable transmission of the request signal 40. Therefore, it is possible to suppress an increase in the communication traffic.

Alternatively, the request unit 105 may be configured to terminate repeating sending the request signal 40 via the first communication unit 101 unless the request unit 105 receives the response signal 50 via the first communication unit 101 within the predetermined time period starting from the time of sending the request signal 40 including the probability information 404 indicating the response probability of 100% via the first communication unit 101.

With this alternative modification, it is possible to prevent unprofitable transmission of the request signal 40. Therefore, it is possible to suppress an increase in the communication traffic. Further, the controller 10 can successfully receive the response signal 50 from the terminal 20 responding to the request signal 40.

The technical concept of the network system of the modification can be applied to the network system of the following second embodiment.

Second Embodiment

Figure 6:
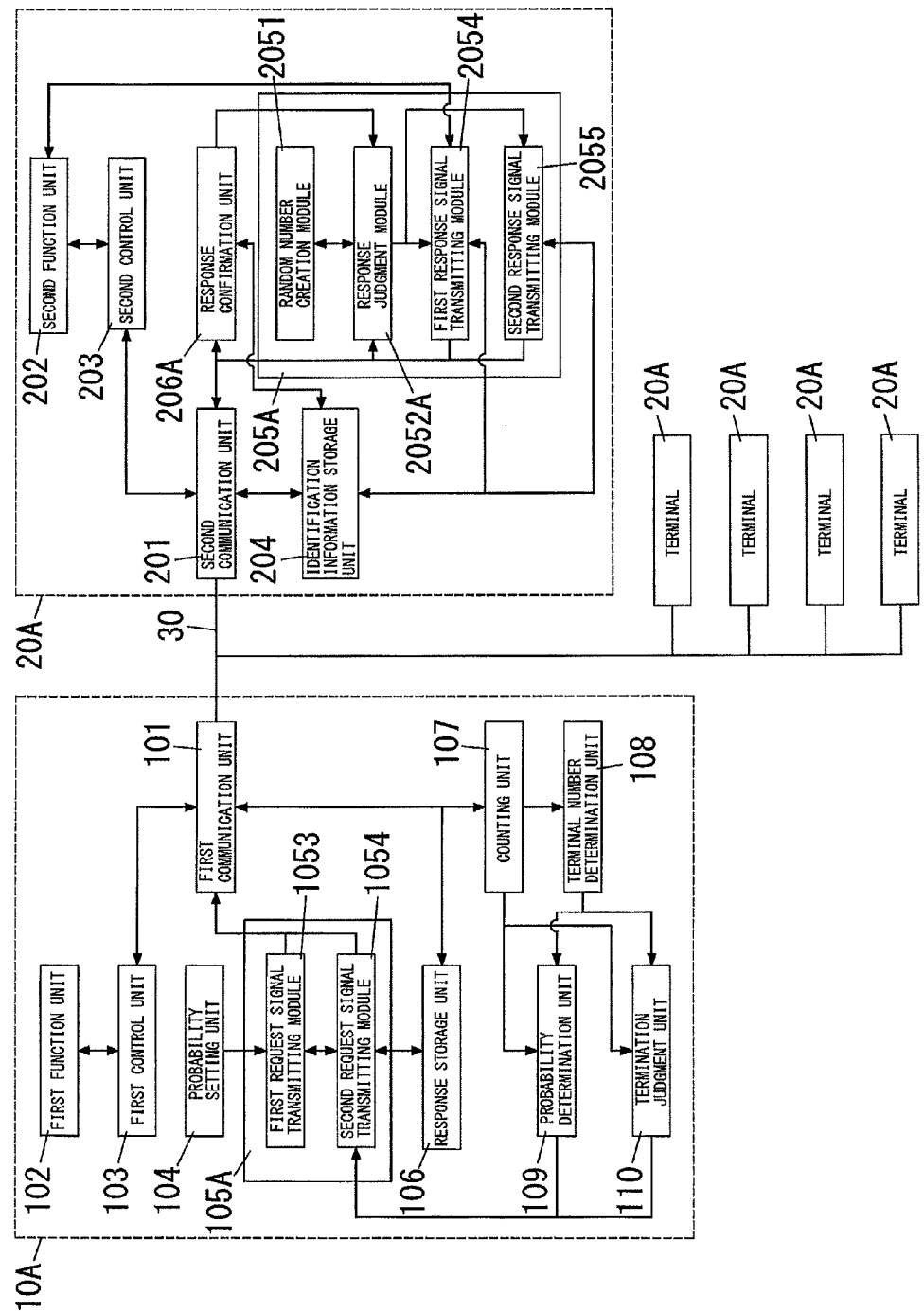
FIG. 6 is a diagram illustrating a configuration of the network system of the second embodiment.

FIG. 6 illustrates the network system of the present embodiment. The network system of the present embodiment includes the controller 10A and the plurality of terminals 20A connected to the controller 10A via the network 30. Components common to the network systems of the first and present embodiments are designated by same reference numerals, and no explanations thereof are deemed necessary.

The controller 10A includes the first communication unit 101, the first function unit 102, and the first control unit 103. The controller 10A further includes the probability setting unit 104, the request unit 105A, the response storage unit 106, the counting unit 107, the terminal number determination unit 108, the probability determination unit 109, and the termination judgment unit 110.

The terminal 20A includes the second communication unit 201, the second function unit 202, and the second control unit 203. The terminal 20A further includes the identification information storage unit 204, the response unit 205A, and the response confirmation unit 206A.

The request unit 105A includes a first request signal transmitting module 1053 and a second request signal transmitting module 1054.

The first request signal transmitting module 1053 is configured to send the first request signal 41 as the request signal 40 to the plurality of the terminals 20A via the first communication unit 101. In other words, the first request signal 41 is multicast.

The first request signal 41 has the same configuration as that of the request signal 40 shown in FIG. 2. The first request signal 41 has the probability information 404 indicative of the response probability which is identical to the response probability set by use of the probability setting unit 104.

The second request signal transmitting module 1054 is configured to repeat sending the second request signal 42A as the request signal 40 to the plurality of the terminals 20A via the first communication unit 101 once after the first request signal 41 is sent from the first communication unit 101. That is, the second request signal 42A is multicast once after the first request signal 41 is multicast.

Figure 7:
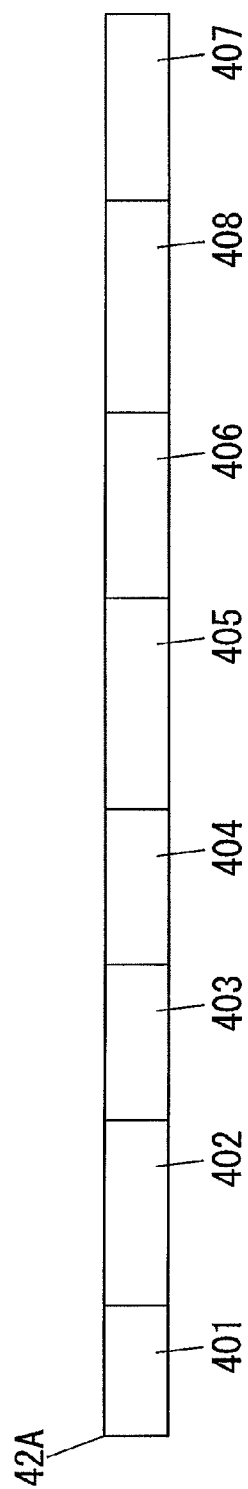
FIG. 7 is a diagram illustrating a configuration of a second request signal in the network system of the second embodiment.

As shown in FIG. 7, the second request signal 42A includes the operation code 401, the interface identifier 402, the object identifier 403, the probability information 404, the sender identification information 405, and the request number 406, in a similar fashion as the first request signal 41. The second request signal 42A has the probability information 404 indicative of the response probability which is identical to the response probability determined by the probability determination unit 109. Besides, the second request signal 42A may include the parameter 407 depending on the type of the operation code 401.

The second request signal 42A further includes response information 408. The response information 408 indicates the identification information stored in the response storage unit 106. The response information 408 is defined as a list (response terminal list) indicative of the terminal 20A which has responded to the controller 10A. The response information 408 is created on the basis of the identification information indicated by the terminal identification information 504 of the response signal 50 sent from the terminal 20A. In the response information 408, the identification information of the terminal 20A which has responded to the request signal 40 sent from the controller 10A is associated with the sender identification information 405 as well as the request number 406. The second request signal 42A is defined as a notification signal announcing the completion of the response to the terminal 20 which has sent the response signal 50.

In the present embodiment, the second request signal 42A is the notification signal for announcing an event to the terminal 20A having the identification information. The event is that the terminal 20A has responded to the controller 10A.

The response confirmation unit 206A is configured to, upon receiving the second request signal 42A via the second communication unit 201, check whether or not the response information 408 included in the second request signal 42A includes the identification information identical to that stored in the identification information storage unit 204. The response confirmation unit 206A is configured to judge that the response has been completed (the terminal 20A has responded to the controller 10A), upon acknowledging that the response information 408 included in the second request signal 42A includes the identification information identical to that stored in the identification information storage unit 204. Upon judging that the response has been completed, the response confirmation unit 206A sends a response termination signal to the response judgment module 2052A.

The response unit 205A includes the random number creation module 2051, the response judgment module 2052A, a first response signal transmitting module 2054, and a second response signal transmitting module 2055.

The response judgment module 2052A is configured to, upon receiving the request signal 40 (the first request signal 41 or the second request signal 42A) via the second communication unit 201, request the random number creation module 2051 to create the random number. The response judgment module 2052A is configured to, upon obtaining the random number from the random number creation module 2051, compare the random number obtained from the random number creation module 2051 with the response probability indicated by the probability information 404 included in the request signal 40. The response judgment module 2052A requests the first response signal transmitting module to send the response signal 50 when the random number is less than the response probability.

Once after the response judgment module 2052A receives the response termination signal from the response confirmation unit 206A, the response judgment module 2052A does not control the second communication unit 201 to send the response signal 50 even if the second communication unit 201 receives the second request signal 42A.

The first response signal transmitting module 2054 operates, in response to a request from the response judgment module 2052A, the object designated by the operation command 401 of the first request signal 41 and sends the response signal 50. The second response signal transmitting module 2055 operates, in response to the request from the response judgment module 2052A, the object designated by the operation command 401 of the second request signal 42A and sends the response signal 50.

Thus, upon receiving the first request signal 41 via the second communication unit 201, the response unit 205A sends the response signal 50 to the controller 10A via the second communication unit 201 at the first response probability indicated by the probability information 404 of the first request signal 41. In addition, the response unit 205A is configured to send, upon receiving the second request signal 42A via the second communication unit 201, the response signal 50 to the controller 10A via the second communication unit 201 at the second response probability indicated by the probability information 404 of the second request signal 42A, until the response confirmation unit 206 judges that the terminal 20A has responded to the controller 10A.

Figure 8:
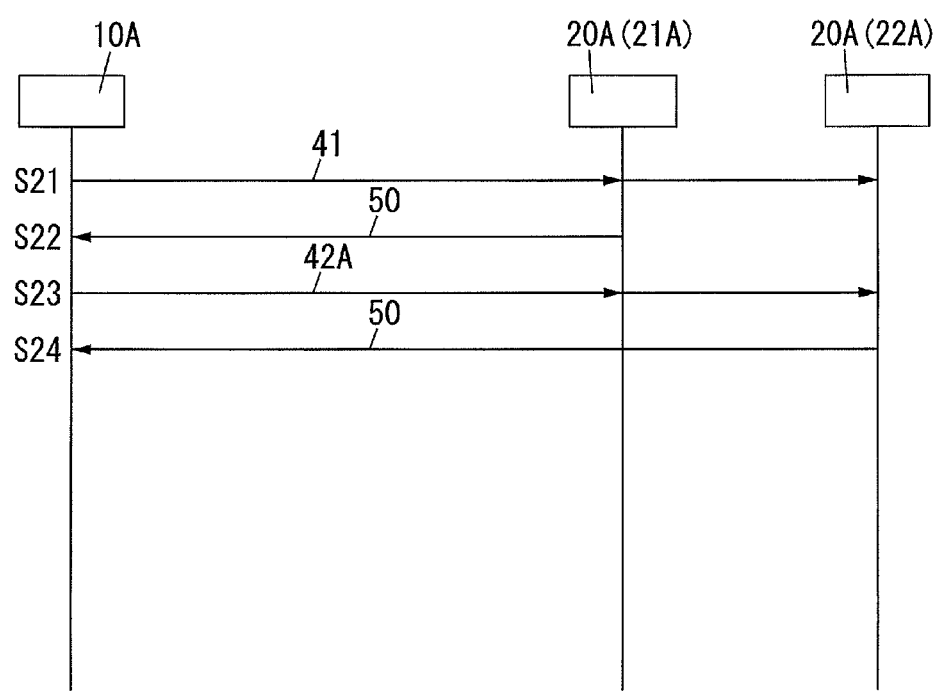
FIG. 8 is a sequence diagram illustrating operation of the network system of the second embodiment.

Next, an explanation referring to FIG. 8 is made to operation of the network system of the present embodiment. In the following explanation, in order to distinguish between the plural terminals 20A, the terminals 20A are respectively designated by use of reference numerals 21A and 22A, if necessary. The terminal 21A includes the object having the object unique identifier "OID1". The object having "OID1" includes interfaces respectively having the interface identifiers "IID5" and "IID7". The terminal 22A includes the object having the object unique identifier "OID2". The object having "OID2" includes interfaces respectively having the interface identifiers "IID3" and "IID7".

As to the controller 10A, the request unit 105A controls the first communication unit 101, thereby multicasting the first request signal 41 to the terminals 21A and 22A (S21). For example, the first request signal 41 includes the operation code 401 of "Watch", the object unique identifier 403 of "k", the interface identifier 402 of "IID7", the probability information 404 indicating the response probability of "50%".

Only the terminals 21A and 22A including the interface having the interface identifier "IID7" receive the first request signal 41. The number of the terminals 20A including the interface having the interface identifier "IID7" is 2. The first response probability indicated by the probability information 404 of the first request signal 41 is 50%. In theory, one terminal 20A sends the response signal 50. In the instance shown in FIG. 8, only the terminal 21A sends the response signal 50 (S22).

In the controller 10A, the response storage unit 106 stores the identification information (identification information of the terminal 21A) indicated by the terminal identification information 504 included in the response signal 50 received by the first communication unit 101. The counting unit 107 counts the response signals 50 which the first communication unit 101 receives within the response waiting time period starting from the time of sending the first request signal 41. The terminal number determination unit 108 determines the maximum number of the terminals 20A provided with the interface having the interface identifier "IID7". In the instance shown in FIG. 8, only the terminal 21A sends the response signal 50. Therefore, the terminal number determination unit 108 uses, as the total number of the terminals 20A, a value (=2) calculated by multiplying 100 by a quotient (=0.02) of the number (=1) of the response signals 50 received by the first communication unit 101 and the response probability (=50[%]).

The probability determination unit 109 uses, as the remaining number of the terminals 20A, a value (=1) calculated by subtracting the number (=1) of the response signals 50 obtained from the counting unit 107 from the total number (=2) of the terminals 20A determined by the terminal number determination unit 108. The probability determination unit 109 determines the new response probability in the range of the current response probability (50[%]) to the probability (=100[%]) calculated by dividing the maximum simultaneous reception number (=1) of the first communication unit 101 by the remaining number (=1) of the terminals 20A and multiplying by 100. For example, the probability determination unit 109 selects 100 [%] as the response probability.

The total number of the terminals 20 determined by the terminal number determination unit 108 is 2, and the accumulated number of the response signals 50 obtained from the counting unit 107 is 1. Therefore, the remaining number of the terminals 20 is 1. In this instance, since the remaining number of terminals 20 is 1, the termination judgment unit 110 does not send the termination notifying signal to the request unit 105A (second request signal transmitting unit 1054).

In the request unit 105A, once after the probability determination unit 109 determines the response probability, the second request signal transmitting module 1054 creates the second request signal 42A which includes the probability information 404 indicative of the response probability (=100 [%]) determined by the probability determination unit 109 and the response information 408 indicative of the identification information (identification information of the terminal 21A) stored in the response storage unit 106. With the exception of the probability information 404 and the response information 408, the second request signal 42A is same as the first request signal 41. The second request signal 42A is multicast to the terminals 21A and 22A (S23).

Only the terminals 21A and 22A including the interface having the interface identifier "IID7" receives the second request signal 42A. In each terminal 20A, the response confirmation unit 206A checks whether or not the response information 408 included in the second request signal 42A includes the information identifier same as that stored in the identification information storage unit 204. The response information 408 includes the information identifier same as that stored in the identification information storage unit 204 of the terminal 21A. Consequently, the response confirmation unit 206A of the terminal 21A judges that the terminal 21A has responded to the controller 10A. Therefore, the terminal 21A sends no response signal 50. The response information 408 does not include the information identifier same as that stored in the identification information storage unit 204 of the terminal 22A. Consequently, the response confirmation unit 206A of the terminal 22A judges that the terminal 22A has not responded to the controller 10A. Therefore, the terminal 22A sends the response signal 50 at the second response probability (=100[%]) indicated by the probability information 404 of the second request signal 42A (S24).

In the controller 10A, the response storage unit 106 stores the identification information (identification information of the terminal 22A) indicated by the terminal identification information 504 included in the response signal 50 received by the first communication unit 101. The counting unit 107 counts the response signals 50 received by the first communication unit 101 within the response waiting time period starting from the time of sending the second request signal 42A. In the instance shown in FIG. 8, only the terminal 22A sends the response signal 50 in response to the second request signal 42A.

The terminal number determination unit 108 determines that the total number of the terminals 20A is 2. The accumulated number of the response signals 50 obtained from the counting unit 107 is 2. Therefore, the remaining number of the terminals 20A is 0. Consequently, the termination judgment unit 110 sends the termination notifying signal to the request unit 105A (second request signal transmitting module 1054), and then the request unit 105A (second request signal transmitting module 1054) terminates repeating sending the request signal 40 via the first communication unit 101.

As described in the above, the network system of the present embodiment includes the controller 10A, and the plurality of terminals 20A connected to the controller 10A via the network 30. The controller 10A includes the first communication unit 101 configured to communicate with the terminals 20A via the network, the request unit 105A, and the response storage unit 106. Each of the terminals 20A includes the second communication unit 201 configured to communicate with the controller 10A via the network 30, the identification storage unit 204 configured to store identification information assigned to the terminal 20A, the response unit 205A, and the response confirmation unit 206A.

Particularly, in the network system of the present embodiment, the request unit 105A includes the first request signal transmitting module 1053 and the second request signal transmitting module 1054. The first request signal transmitting module 1053 is configured to send the first request signal 41 as the request signal 40 to the plurality of the terminals 20A via the first communication unit 101. The second request signal transmitting module 1054 is configured to repeat sending the second request signal 42A as the request signal 40 to the plurality of the terminals 20A via the first communication unit 101 once after the first request signal 41 is sent from the first communication unit 101. The second request signal 42A is defined as the notification signal including the response information 408 indicative of the identification information stored in the response storage unit 106. The response unit 205A is configured to, upon receiving the first request signal 41 via the second communication unit 201, send the response signal 50 to the controller 10A via the second communication unit 201 at the response probability indicated by the probability information 404 of the first request signal 41. The response confirmation unit 206A is configured to, upon receiving the second request signal 42A via the second communication unit 201, check whether or not the response information 408 included in the second request signal 42A includes the identification information identical to that stored in the identification information storage unit 204. The response confirmation unit 206A is configured to judge that the terminal 20A has already responded to the controller 10 when the response information 408 of the second request signal 42A includes the identification information identical to that stored in the identification information storage unit 204. The response unit 205A is configured to send, upon receiving the second request signal 42A via the second communication unit 201, the response signal 50 to the controller 10A via the second communication unit 201 at the response probability indicated by the probability information 404 of the second request signal 42A, until the response confirmation unit 206A judges that the terminal 20A has responded to the controller 10A.

Accordingly, the network system of the present embodiment can decrease the number of the response signals 50 which are simultaneously sent from the terminals 20 when the request signal 40 is multicast. Consequently, even with the use of relatively low speed communication transport, the network system can be free from packet loss otherwise caused by the collision between the response signals 50.

Moreover, the controller 10 repeats sending the request signal 40. Once after sending the response signal 50 in response to the request signal 40, the terminal 20 sends no response signal 50 even upon reception of the request signal 40. Therefore, the controller 10 can successfully and efficiently receive the response signals 50 respectively from all of the terminals 20 which are entitled to receive the request signal 40. Besides, the present embodiment is still effective even if the controller 10 is arranged to receive and process only a small number of the packets.

Besides, the network system of each embodiment may include a plurality of the controllers 10 or 10A. Further, the controller 10 or 10A may broadcast the request signal 40.

The invention claimed is:

1. A network system comprising:
   a controller; and
   a plurality of terminals connected to said controller via a network,
   wherein
   said controller comprises a first communication unit configured to communicate with said terminals via the network, a request unit, and a response storage unit,
   each of said terminals comprising a second communication unit configured to communicate with said controller via the network, a identification storage unit configured to store identification information assigned to said terminal, a response unit, and a response confirmation unit,
   said request unit being configured to repeat sending a request signal to the plurality of said terminals via said first communication unit, the request signal including probability information indicative of a predetermined probability,
   said response unit being configured to, upon receiving the request signal via said second communication unit, send a response signal via said second communication unit at the probability indicated by the probability information included in the request signal,
   the response signal including terminal identification information indicative of the identification information stored in said identification storage unit,
   said response storage unit being configured to, upon receiving the response signal via said first communication unit, store the identification information indicated by the terminal identification information included in the response signal,
   said request unit being configured to refer to the identification information stored in said response storage unit, and send via said first communication unit a notification signal announcing completion of a response to said terminal which has sent the response signal,
   said response confirmation unit being configured to, upon receiving the notification signal via said second communication unit, judge whether or not the response has been completed on the basis of the notification signal,
   said response unit being configured not to send the response signal via said second communication unit in response to receiving the request signal via said second communication unit, once after said response confirmation unit judges that the response has been completed, and
   said request unit being configured to prepare the next request signal including the probability information indicative of the probability not less than that indicated by the probability information included in the previous request signal.

2. The network system as set forth in claim 1, wherein
   said controller further comprises a counting unit, a terminal number determination unit, and a probability determination unit,
   said counting unit being configured to count the response signals received by said first communication unit after said first communication unit sends the request signal,
   said terminal number determination unit being configured to determine a total number of said terminals responding to said controller on the basis of the probability indicated by the probability information included in the request signal sent by said first communication unit and the number of the response signals obtained from said counting unit,
   said probability determination unit being configured to determine the probability on the basis of the total number of said terminals determined by said terminal number determination unit, and
   said request unit being configured to create the request signal including the probability information indicative of the probability determined by said probability determination unit.

3. The network system as set forth in claim 1, wherein
   said controller further comprises a counting unit, a terminal number determination unit, and a termination judgment unit,
   said counting unit being configured to count the response signals received by said first communication unit after said first communication unit sends the request signal,
   said terminal number determination unit being configured to determine a total number of said terminals responding to said controller on the basis of the probability indicated by the probability information included in the request signal sent by said first communication unit and the number of the response signals obtained from said counting unit,
   said termination judgment unit being configured to judge whether or not said controller has received the response signals respectively from all of said terminals responding to the request signal on the basis of the total number of said terminals determined by said terminal number determination unit and the number of the response signals obtained from said counting unit, and said request unit being configured to terminate repeating sending the request signal via said first communication unit upon acknowledging that said termination judgment unit determines that said controller has received the response signals respectively from all of said terminals responding to the request signal.

4. The network system as set forth in claim 1, wherein
said request unit is configured to terminate repeating sending the request signal via said first communication unit upon sending the request signal including the probability information indicative of the probability of 100% via said first communication unit.

5. The network system as set forth in claim 1, wherein
said request unit is configured to terminate repeating sending the request signal via said first communication unit unless said request unit receives the response signal via said first communication unit within a predetermined time period starting from the time of sending the request signal including the probability information indicating the probability of 100% via said first communication unit.

\* \* \* \* \*